United States Patent
Sevindik (10) Patent No.: US 9,525,535 B1
(45) Date of Patent: Dec. 20, 2016

(54) SYSTEMS AND METHODS FOR SCHEDULING TRANSMISSIONS FROM AN ACCESS NODE

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 313 days.

(21) Appl. No.: 14/454,900

(22) Filed: Aug. 8, 2014

(51) Int. Cl.
*H04L 5/00* (2006.01)
*H04W 24/08* (2009.01)

(52) U.S. Cl.
CPC ............ *H04L 5/0058* (2013.01); *H04W 24/08* (2013.01)

(58) Field of Classification Search
CPC ...... H04W 72/12; H04W 24/08; H04L 5/0058
See application file for complete search history.

(56) References Cited

U.S. PATENT DOCUMENTS

| | | |
|---|---|---|
| 6,850,540 B1 | 2/2005 | Peisa et al. |
| 7,719,973 B2 | 5/2010 | Abedi |
| 8,228,920 B2 | 7/2012 | Hamilton et al. |
| 2013/0040681 A1* | 2/2013 | Lee .......................... H04L 47/14 455/512 |

* cited by examiner

*Primary Examiner* — Siming Liu (57) ABSTRACT

Systems and methods are described for scheduling transmission from an access node. Network conditions in a communication network comprising an access node may be monitored. A scheduling algorithm may be selected for the access node based on the monitored network conditions. Data transmissions may be scheduled from the access node based on the selected scheduling algorithm. And data may be transmitted from the access node to wireless devices based on the transmission schedule.

20 Claims, 5 Drawing Sheets

SYSTEMS AND METHODS FOR SCHEDULING TRANSMISSIONS FROM AN ACCESS NODE

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold) or poor channel conditions. For example, a communication link may experience large amount of data traffic or poor channel conditions may render a communication link less effective, and the efficiency of the system may suffer. Accordingly, a system that effectively balances load and considers channel conditions may be able to provide a high quality service to users of the system.

OVERVIEW

Systems and methods are described for scheduling transmission from an access node. Network conditions in a communication network comprising an access node may be monitored. A scheduling algorithm may be selected for the access node based on the monitored network conditions. Data transmissions may be scheduled from the access node based on the selected scheduling algorithm. And data may be transmitted from the access node to wireless devices based on the transmission schedule.

DETAILED DESCRIPTION

Figure 1:
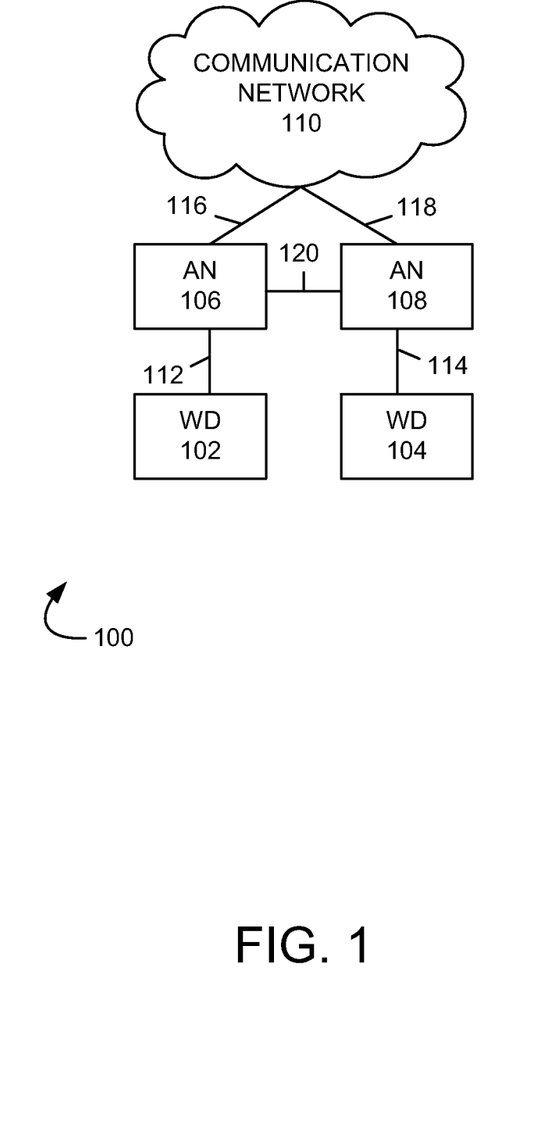
FIG. 1 illustrates an exemplary communication system to schedule transmissions from an access node.

FIG. 1 illustrates an exemplary communication system 100 to schedule transmissions from an access node comprising wireless devices 102 and 104, access nodes 106 and 108, communication network 110, and communication links 112, 114, 116, 118, and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, and communication network 110 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 106 and 108, any number of wireless devices can be implemented.

Access nodes 106 and 108 are network nodes capable of providing wireless communications to wireless devices 102 and 104, and can be, for example, a base transceiver station, a radio base station, or an eNodeB device. Access nodes 106 and 108 may communicate with communication network 110 over communication links 116 and 118 respectively. Access nodes 106 and 108 may also communicate directly with each other over communication link 120.

Although only access nodes 106 and 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless device 102 such that access node 106 provides the wireless device access to a communication network (e.g., communication network 110). Similarly, access node 108 may establish communication with wireless device 104 such that access node 108 provides the wireless device access to a communication network (e.g., communication network 110).

In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 106 may communicate with a plurality of wireless devices, including wireless device 102. For example, access node 106 may comprise a scheduler that schedules wireless resources for communication with wireless devices. For example, a scheduler may distribute wireless resources (e.g., bandwidth, physical resource blocks, and the like) for communication with wireless devices. A physical resource block may comprise a block (e.g., a unit of wireless spectrum) used to communicate data between an access node and a wireless device.

In an embodiment, network conditions may affect the efficiency of the communications between the access node and the wireless devices. For example, a number of connected wireless devices, channel conditions for wireless devices, a percentage of wireless resources being used, and other suitable network conditions may affect how well the access node is able to communicate with the plurality of wireless devices. Accordingly, a scheduler that schedules wireless resources based on network conditions may provide enhanced wireless services for the wireless devices.

Systems and methods are described for scheduling transmission from an access node. Network conditions in a communication network comprising an access node may be monitored. A scheduling algorithm may be selected for the access node based on the monitored network conditions. Data transmissions may be scheduled from the access node based on the selected scheduling algorithm. And data may be transmitted from the access node to wireless devices based on the transmission schedule.

Figure 2:
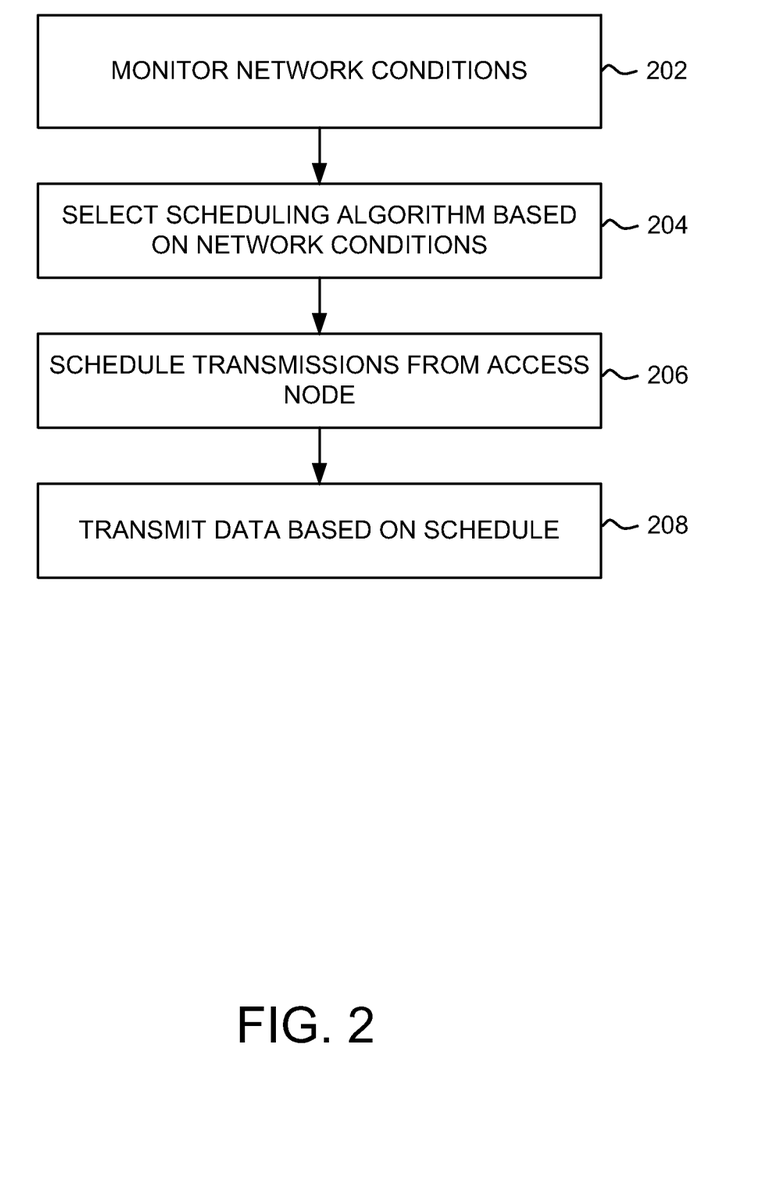
FIG. 2 illustrates an exemplary method of scheduling transmissions from an access node.

FIG. 2 illustrates an exemplary method for scheduling transmissions from an access node. The method will be discussed with reference to the exemplary communication system 100 illustrated in FIG. 1, however, the method can be implemented with any suitable communication system.

Referring to FIG. 2, at step 202, network conditions for a communication network comprising an access node may be monitored. For example, network conditions may be monitored for system 100. Network conditions may comprise, for example, a number of wireless devices connected to the network (e.g., RRC connections), traffic types (e.g., bearer types) for the wireless devices, the time of day (e.g., busy time of day or dormant time of day), setting (e.g. urban, metropolitan, suburban, and the like), backhaul capacity (e.g., Fiber, T1, E1, and the like), number of nodes in the network, types of nodes in the network (e.g., macro cells, pico cells, femto cells, and the like), mobility for wireless devices, wireless device type (e.g., smartphones, basic phones, tablets, hotspots, laptops, and the like), other network offload (e.g., wifi offload), available wireless spectrum, user type (e.g., business or personal), and any other suitable network conditions. The network conditions may be monitored based on access node conditions, core network (e.g., controller node and/or gateway node) conditions, network configurations stored (e.g., backhaul capacity, number of nodes, types of nodes, and the like), such as stored in a database, and other suitable monitoring methods.

At step 204, scheduling algorithm may be selected for an access node based on the monitored network conditions. For example, a scheduling algorithm may be selected for access node 106 based on the monitored network conditions. The scheduling algorithm may comprise one of a fair scheduling algorithm, a data rate scheduling algorithm, and a hybrid scheduling algorithm.

At step 206, data transmission may be scheduled from the access node based on the selected scheduling algorithm. For example, data transmission may be scheduled for a plurality of wireless devices from access node 106 based on the selected scheduling algorithm.

At step 208, the access node may transmit data to the plurality of wireless devices based on the transmission schedule. For example, access node 106 may schedule data transmission to the plurality of wireless devices based on the scheduled data transmission (e.g., scheduled based on the selected scheduling algorithm).

Figure 3:
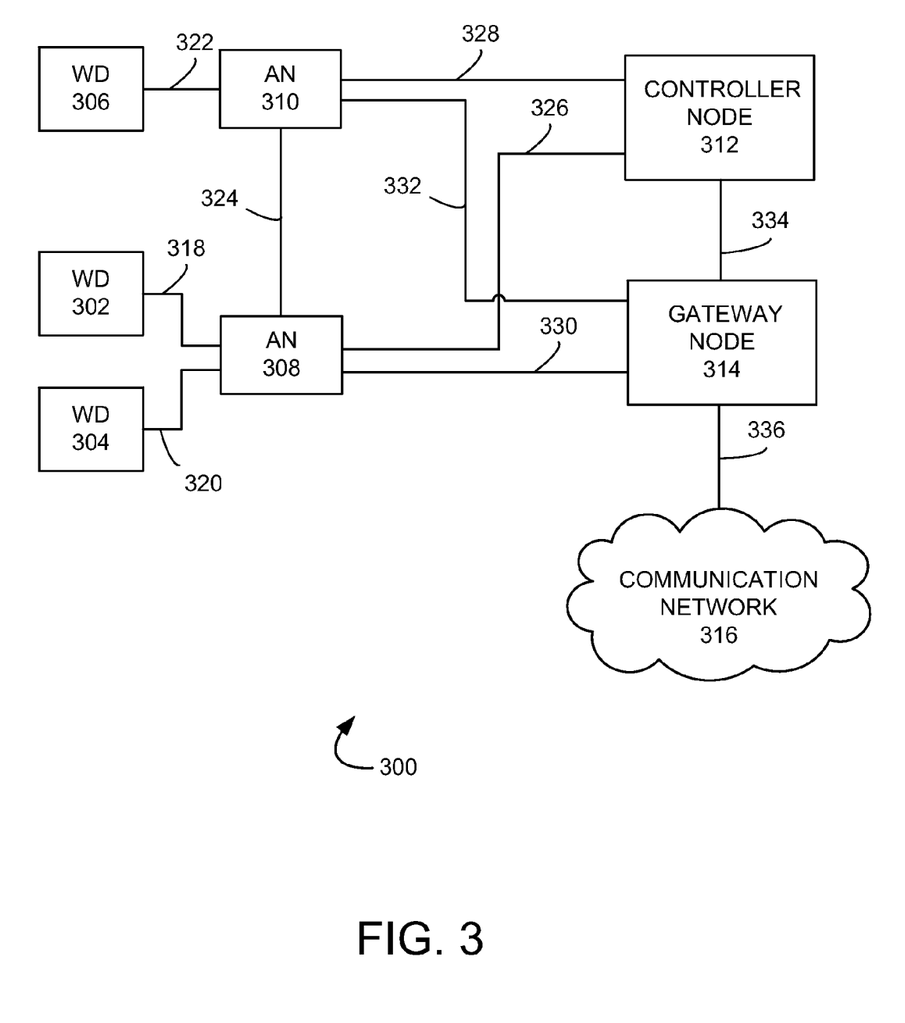
FIG. 3 illustrates another exemplary communication system to schedule transmissions from an access node.

FIG. 3 illustrates another exemplary communication system 300 to schedule transmissions from an access node. Communication system 300 may comprise a wireless devices 302, 304, and 306, access nodes 308 and 310, controller node 312, gateway node 314, communication network 316, and communication links 318, 320, 322, 324, 326, 328, 330, 332, 334 and 336. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, and 306 can be any device configured to communicate over communication system 300 using a wireless communication link. For example, wireless devices 302, 304, and 306 can include a cell phone, a smart phone, a computing platform such as a laptop, palmtop, or a tablet, a personal digital assistant, or an internet access device, and combinations thereof.

Access nodes 308 and 310 are network nodes capable of providing wireless communications to wireless devices 302, 304, and 306, and can be, for example, a base transceiver station, a radio base station, or an eNodeB device. In an embodiment, access nodes 308 can comprise a serving access node for wireless devices 302 and 304, and access node 310 can comprise a serving access node for wireless device 306. Access nodes 308 and 310 may communicate with controller node 312 over communication links 328 and 326, respectively, and with gateway node 314 over communication links 330 and 332, respectively. Access nodes 308 and 310 may also communicate directly with each other over communication link 324.

Controller node 312 can be any network node configured to manage services within system 300. Controller node 312 may provide other control and management functions for system 300. The controller node 312 can be a single device having various functions or a plurality of devices having differing functions. For example, controller node 312 can include at least one of a multi-cell/multicast coordination entity (MCE), a mobility management entity (MME), a radio network controller (RNC), a mobile switching center (MSC), and a combination thereof.

Controller node 312 can comprise a processor and associated circuitry to execute or direct the execution of computer-readable instructions to obtain information. Controller node 312 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 312 can receive instructions and other input at a user interface. Controller node 312 can comprise a processor and associated circuitry to execute or direct the execution of computer-readable instructions to obtain information.

Gateway node 314 is a network element which can comprise a processor and associated circuitry to execute or direct the execution of computer-readable instructions. Gateway node 314 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 314 can provide instructions to access nodes 308 and 310 related to channel selection in communications with wireless devices 302, 304, and 306. For example, gateway node 314 can comprise at least one of a serving gateway (SGW), a packet data network gateway (PDNGW), a cellular gateway (CGW), and a combination thereof.

Communication network 316 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 316 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 316 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 318, 320, 322, 324, 326, 328, 330, 332, 334 and 336 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 308 and 310, controller node 312, gateway node 314, and communication network 316 which are omitted for clarity, including additional processing nodes, routers, gateways, and physical and/or wireless data links for carrying data among the various network elements.

Figure 4:
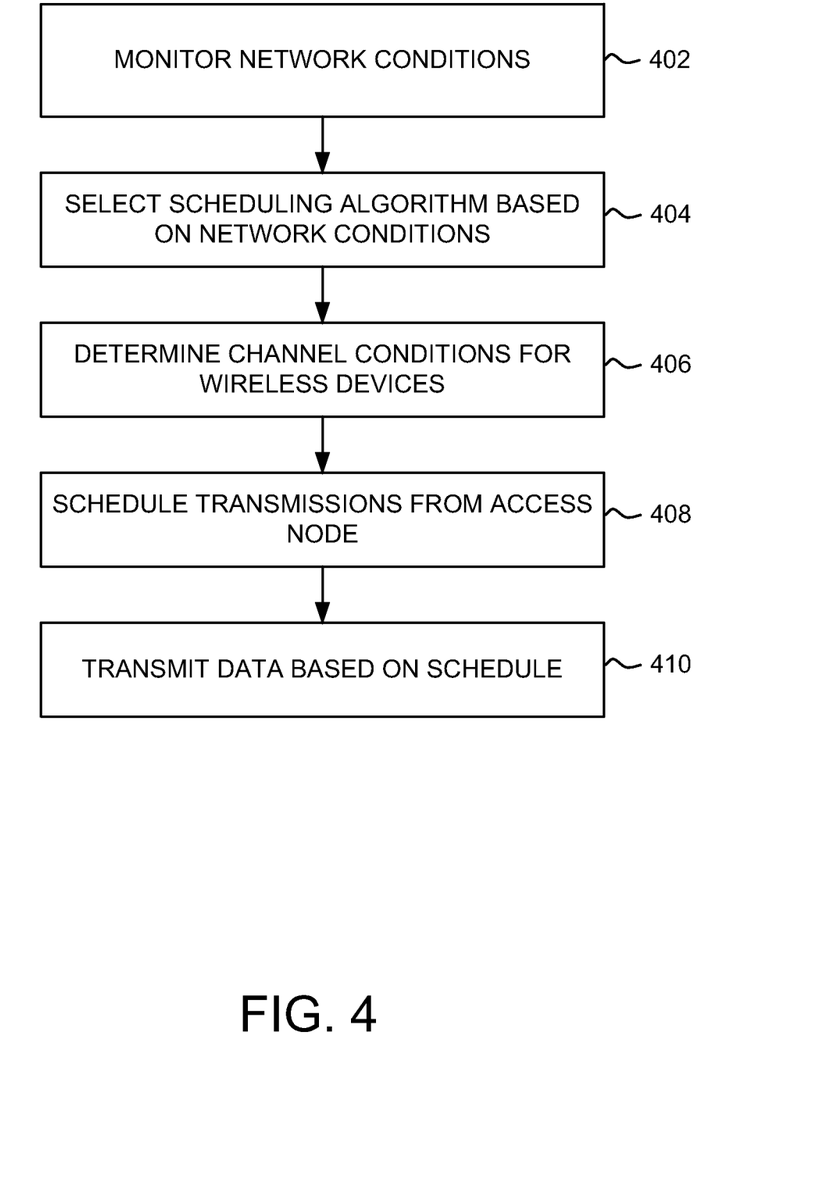
FIG. 4 illustrates another exemplary method of scheduling transmissions from an access node.

In an embodiment, any of controller node 312, gateway node 314, and one or more modules of access nodes 308 and/or 310 may perform all or parts of the methods of FIGS. 2 and 4.

In operation, access node 308 may establish communication with wireless devices 302 and 304 such that access node 308 provides the wireless devices access to a communication network (e.g., communication network 316). Similarly, access node 310 may establish communication with wireless device 306 such that access node 310 provides the wireless device access to a communication network (e.g., communication network 316).

In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 308 may communicate with a plurality of wireless devices, including wireless devices 302 and 304. For example, access node 308 may comprise a scheduler that schedules wireless resources for communication with wireless devices. For example, a scheduler may distribute wireless resources (e.g., bandwidth, physical resource blocks, and the like) for communication with wireless devices. A physical resource block may comprise a block (e.g., a unit of wireless spectrum) used to communicate data between an access node and a wireless device.

In an embodiment, network conditions may affect the efficiency of the communications between the access node and the wireless devices. For example, a number of connected wireless devices, channel conditions for wireless devices, a percentage of wireless resources being used, and other suitable network conditions may affect how well the access node is able to communicate with the plurality of wireless devices. Accordingly, a scheduler that schedules wireless resources based on network conditions may provide enhanced wireless services for the wireless devices.

Systems and methods are described for scheduling transmission from an access node. Network conditions in a communication network comprising an access node may be monitored. A scheduling algorithm may be selected for the access node based on the monitored network conditions. Data transmissions may be scheduled from the access node based on the selected scheduling algorithm. And data may be transmitted from the access node to wireless devices based on the transmission schedule.

FIG. 4 illustrates an exemplary method for scheduling transmissions from an access node. The method will be discussed with reference to the exemplary communication system 300 illustrated in FIG. 3, however, the method can be implemented with any suitable communication system.

Referring to FIG. 4, at step 402, network conditions for a communication network comprising an access node may be monitored. For example, network conditions may be monitored for system 300. Network conditions may comprise, for example, a number of wireless devices connected to the network (e.g., RRC connections), traffic types (e.g., bearer types) for the wireless devices, the time of day (e.g., busy time of day or dormant time of day), setting (e.g. urban, metropolitan, suburban, and the like), backhaul capacity (e.g., Fiber, T1, E1, and the like), number of nodes in the network, types of nodes in the network (e.g., macro cells, pico cells, femto cells, and the like), mobility for wireless devices, wireless device type (e.g., smartphones, basic phones, tablets, hotspots, laptops, and the like), other network offload (e.g., wifi offload), available wireless spectrum, user type (e.g., business or personal), and any other suitable network conditions. The network conditions may be monitored based on access node conditions, core network (e.g., controller node and/or gateway node) conditions, network configurations stored (e.g., backhaul capacity, number of nodes, types of nodes, and the like), such as stored in a database, and other suitable monitoring methods. For example, a database may store the network configuration (e.g., number of access nodes and small cells, and the geographic locations for these nodes) and settings information for system 300. One or more of access node 308, controller node 312, and gateway node 314 may monitor network conditions, such as number of connections, bearer types, wireless device type, network offload, and the like.

At step 404, channel conditions may be determined for wireless devices. For example, channel conditions may be determined for wireless devices 302, 304, and 306. Channel conditions may comprise the wireless channel conditions between each wireless device and its serving access node. Accordingly, channel conditions for wireless devices 302 and 304 may be based on communications with access node 308, and channel conditions for wireless device 306 may be based on communications with access node 310. Channel conditions may comprise a channel quality indicator (CQI). A CQI may be based on a received signal level (e.g., measured in signal to interference plus noise ratio, SINR) for a reference signal received at the wireless device from the serving access node. A CQI may be tracked by an access node and/or a controller node based on reports (e.g., measurement reports) transmitted from the wireless device to the access node. Accordingly, the CQI for each wireless device may be updated periodically.

At step 406, scheduling algorithm may be selected for an access node based on the monitored network conditions. For example, a scheduling algorithm may be selected for access node 308 based on the monitored network conditions. The scheduling algorithm may comprise one of a fair scheduling algorithm, a data rate scheduling algorithm, and a hybrid scheduling algorithm.

In an embodiment, a fair scheduling algorithm may comprise a round robin algorithm. For example, a fair scheduling algorithm may distributes wireless resources (e.g., physical resource blocks, wireless spectrum, and the like) equally (or substantially equally) amongst wireless devices. Accordingly, a fair scheduling algorithm may attempt to distribute wireless resources to wireless devices as a round robin algorithm. In an embodiment, the fair scheduling algorithm may not be based on channel conditions for wireless devices. Accordingly, the fair scheduling algorithm may schedule wireless resources independent of channel conditions for the wireless devices.

In an embodiment, a data rate scheduling algorithm may schedule wireless resources to optimize data communication rates. In some circumstances, it may be beneficial to distribute resources unevenly. For example, where wireless devices have varying channel quality values (e.g., CQIs), it may be beneficial to distribute wireless resources to the wireless devices that comprise high channel quality values because these wireless devices can make best use of the wireless resources (e.g., may achieve higher data communication rates). Accordingly, a data rate scheduling algorithm may attempt to distribute wireless resources (e.g., physical resources blocks, wireless spectrum, and the like) to wireless devices with the greatest channel quality (e.g., reported CQI). For example, a next physical resource block available may be scheduled for the wireless device with the highest reported CQI.

In an embodiment, a hybrid scheduling algorithm may schedule wireless resources based on a balance between the fair scheduling algorithm and the data rate scheduling algorithm. For example, CQI values may be tracked for each of a plurality of wireless devices over a time period (e.g., minutes, hours, and the like). The CQI values may then be averaged for each wireless device over the time period, and an average CQI may be calculated. Additionally, an instantaneous CQI may be determined for each wireless device. A metric may be calculated for each wireless devices based on a ratio of the instantaneous CQI per the average CQI. Wireless resources (e.g., physical resources blocks, wireless spectrum, and the like) may then be distributed to the wireless devices that comprise high calculated metrics. For example, a next physical resource block available may be scheduled for the wireless device with the highest calculated metric. In an embodiment, the instantaneous CQI may also comprise an average where the average is taken over a smaller time period than the time period for the average CQI. For example, an instantaneous CQI may comprise a CQI reported from a wireless device in a measurement report transmitted to an access node.

In an embodiment, the selected scheduling algorithm may be based on monitored network conditions, such as a number of wireless devices using the communication network. For example, a number of radio resource control (RRC) connections may indicate a number of wireless devices on the network (e.g., system 300). In an embodiment, the number of wireless devices may be based on the number of RRC connections for access node 308, the number of RRC connections for access nodes 308 and 310, or the number of RRC connections for a plurality of other access nodes (e.g. small cells, macro cells, and the like). In an embodiment, the hybrid scheduling algorithm may be selected where a number of connections meets a connections criteria (e.g., threshold number of connections), and the data rate scheduling algorithm may be selected where the number of connections does not meet the connections criteria. An example connections criteria may comprise a threshold number of wireless devices connected to access node 308, to access nodes 308 and 310, for system 300, or for a plurality of access nodes.

In an embodiment, where wifi offload is determined to meet an offload criteria, the selected scheduling algorithm may be adjusted. For example, a hybrid scheduling algorithm may be selected where a number of connections meets the connections criteria. However, the scheduling algorithm may be adjusted where wifi offload is determined to meet an offload criteria. Wifi offload may comprise a number of wireless devices (or an amount of spectrum/number or physical resources blocks) that are offloaded from an access node (or a plurality of access nodes) to a wifi network (e.g., wifi access point). The core network (e.g., controller node 312) may monitor wifi offload for system 300. In the above example, where wifi offload meets an offload criteria (e.g., a threshold number of wireless devices, a threshold amount of spectrum, a threshold number of physical resource blocks), the selected scheduling algorithm may be adjusted from the hybrid scheduling algorithm to the data rate scheduling algorithm.

In an embodiment, the selected scheduling algorithm may be based on monitored network conditions, such as traffic types for wireless devices on the communication network. For example, wireless devices connected to system 300 (e.g., wireless devices 302 and 304) may comprise one or more data bearers used to communicate data between the wireless devices and an access node (e.g., access node 308). Example bearer types may comprise a guaranteed bearer (e.g., guaranteed minimum data rate) and a non-guaranteed bearer. In an embodiment, the traffic type may be based on a number (e.g., absolute number or percentage of overall traffic) of guaranteed bearers and a number of non-guaranteed bearers. In an embodiment, the data rate scheduling algorithm may be selected where a number of guaranteed bearers meets a guaranteed bearer criteria (e.g., threshold number of guaranteed bearers or a threshold percentage of guaranteed bearers), and the hybrid scheduling algorithm may be selected where the number of guaranteed bearers does not meet the guaranteed bearer criteria. An example guaranteed bearer criteria may comprise a threshold number of guaranteed bearers (or a threshold percentage of guaranteed bearers) for access node 308.

In an embodiment, the selected scheduling algorithm may be based on monitored network conditions, such as a mobility for wireless devices on the communication network. For example, wireless devices connected to system 300 (e.g., wireless devices 302 and 304) may comprise a mobility. The mobility may be determined based on tracked signal levels detected at the wireless device (e.g., detected reference signal levels from access nodes compared over a period of time), a reported mobility for the wireless device, a global position system (GPS), and any other suitable method. In an embodiment, a mobility may be determined based on an aggregate for the mobility of wireless devices connected to system 300 (e.g., a number of highly mobile wireless devices and stationary wireless devices). For example, the mobility may be based on the mobility for wireless devices in communication with access node 308, in communication with access nodes 308 and 310, in communication a plurality of other access nodes (e.g. small cells, macro cells, and the like), or that are connected to system 300. In an embodiment, the fair scheduling algorithm may be selected where a number of highly mobile wireless devices meets a mobility criteria (e.g., threshold number of highly mobile wireless devices or a threshold percentage of highly mobile wireless devices), and the hybrid scheduling algorithm may be selected where the number of highly mobile wireless devices does not meet the mobility criteria. An example mobility criteria may comprise a threshold number of highly mobile wireless devices (or a threshold percentage of highly mobile wireless devices). A wireless device may be determined to be highly mobile when the mobility for the wireless device meets a high mobility criteria (e.g., mobility above a threshold for highly mobile wireless devices).

In an embodiment, the selected scheduling algorithm may be based on monitored network conditions, such as a setting for the communication network. For example, system 300 may be located in an urban setting, suburban setting, or a metropolitan setting. The monitored network conditions may be based on the setting for access node 308 or system 300. In an embodiment, the hybrid scheduling algorithm may be selected where the setting comprises a suburban setting or an urban setting, and the fair scheduling algorithm may be selected when the setting comprises an urban setting.

In an embodiment, the selected scheduling algorithm may be based on monitored network conditions, such as a type of wireless devices connected to the communication network. For example, the wireless devices connected to system 300 may comprise smart phones, basic phones, tablets, laptops, hot spots, and other suitable devices. A smart phone may comprise a wireless device capable of running data intensive applications (e.g., streaming video). A basic phone may comprise a device that is not capable of running data intensive applications. A hot spot may comprise a device that enables a plurality of devices to connect to system 300 using the hot spot. The monitored network conditions may be based on the number of wireless devices connected to access node 308, access nodes 308 and 310, a plurality of access nodes, or system 300. Each wireless device may be categorized as either a low data device, a medium data device, or a high data device. For example, a basic phone may comprise a low data device, a smart phone, tablet, or laptop may comprise a medium data device, and a hot spot may comprise a high data device. In an embodiment, the data rate scheduling algorithm may be selected where the number of high data devices meets a high data device criteria (e.g., threshold number or percentage of wireless devices), the hybrid scheduling algorithm may be selected where the number of medium data devices meets a medium data device criteria (e.g., threshold number or percentage of wireless devices), and the fair scheduling algorithm may be selected where the number of low data devices meets a low data device criteria (e.g., threshold number or percentage of wireless devices). In an embodiment, where none of the numbers of high, medium, or low data devices meets their respective criteria, or where more than one meets their respective criteria, the hybrid scheduling algorithm may be selected.

In an embodiment, the selected scheduling algorithm may be based on monitored network conditions, such as a type of user for connected wireless devices. For example, wireless devices connected to system 300 may comprise business users and personal users. The monitored network conditions may be based on the types of users for wireless devices in communication with access node 308, access nodes 308 and 310, or system 300. In an embodiment, the hybrid scheduling algorithm may be selected when the number of business users meets a business user criteria (e.g., threshold number or percentage of wireless devices) and the fair scheduling algorithm may be selected when the number of personal users meets a personal user criteria (e.g., threshold number or percentage of wireless devices).

In an embodiment, the selected scheduling algorithm may be based on a plurality of monitored network conditions, such as a number of wireless devices using the communication network and traffic types for wireless devices using the communication network. For example, the data rate scheduling algorithm may be selected where a number of guaranteed bearers meets the guaranteed bearer criteria and a number of connections meets the connections criteria, and the hybrid scheduling algorithm may be selected where the number of guaranteed bearers meets a guaranteed bearer criteria and the number of connections does not meet the connections criteria. In another example, the data rate scheduling algorithm may be selected where the number of guaranteed bearers does not meet the guaranteed bearer criteria and the number of connections meets the connections criteria.

In an embodiment, the selected scheduling algorithm may be based on a number of wireless devices using the communication network, traffic types for wireless devices using the communication network, and a mobility for the wireless devices using the communication network. For example, the data rate scheduling algorithm may be selected where a number of guaranteed bearers meets the guaranteed bearer criteria, a number of connections meets the connections criteria, and a number of highly mobile wireless devices does not meet the mobility criteria. In another example, the hybrid scheduling algorithm may be selected where the number of highly mobile wireless devices meets the mobility criteria, the number of guaranteed bearers meets the guaranteed bearer criteria, and a number of connections meets the connections criteria. In yet another example, the fair scheduling algorithm may be selected where the number of highly mobile wireless devices meets mobility criteria, and only one of the number of guaranteed bearers meets the guaranteed bearer criteria and a number of connections meets the connections criteria.

In an embodiment, the selected scheduling algorithm may be based on an average backhaul capacity as measured at an access node (i.e. access nodes 308 or 310 over links 330 or 332) over a period of time. For example, the data rate scheduling algorithm may be selected if the average backhaul capacity exceeds a capacity threshold. In another example, the fair scheduling algorithm may be selected if the average backhaul capacity is below a capacity threshold. In yet another example, the hybrid scheduling algorithm may be selected if the average backhaul capacity does not exceed or fall below the capacity thresholds.

In an embodiment, the selected scheduling algorithm may be based on a network topology that includes macro cells and small cells. For example, the data rate scheduling algorithm may be selected if the small cell is deployed near a macro cell for coverage extension purposes. In another example, the fair scheduling algorithm may be selected if the small cell is deployed near a macro cell for capacity improvement purposes. In yet another example, the hybrid scheduling algorithm may be selected if the small cell is deployed near a macro cell for both coverage extension and capacity improvement purposes.

At step 408, data transmission may be scheduled from the access node based on the selected scheduling algorithm. For example, data transmission may be scheduled for a plurality of wireless devices from access node 308 based on the selected scheduling algorithm.

At step 410, the access node may transmit data to the plurality of wireless devices based on the transmission schedule. For example, access node 308 may schedule data transmission to the plurality of wireless devices (e.g., wireless devices 302 and 304) based on the scheduled data transmission (e.g., scheduled based on the selected scheduling algorithm).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 5:
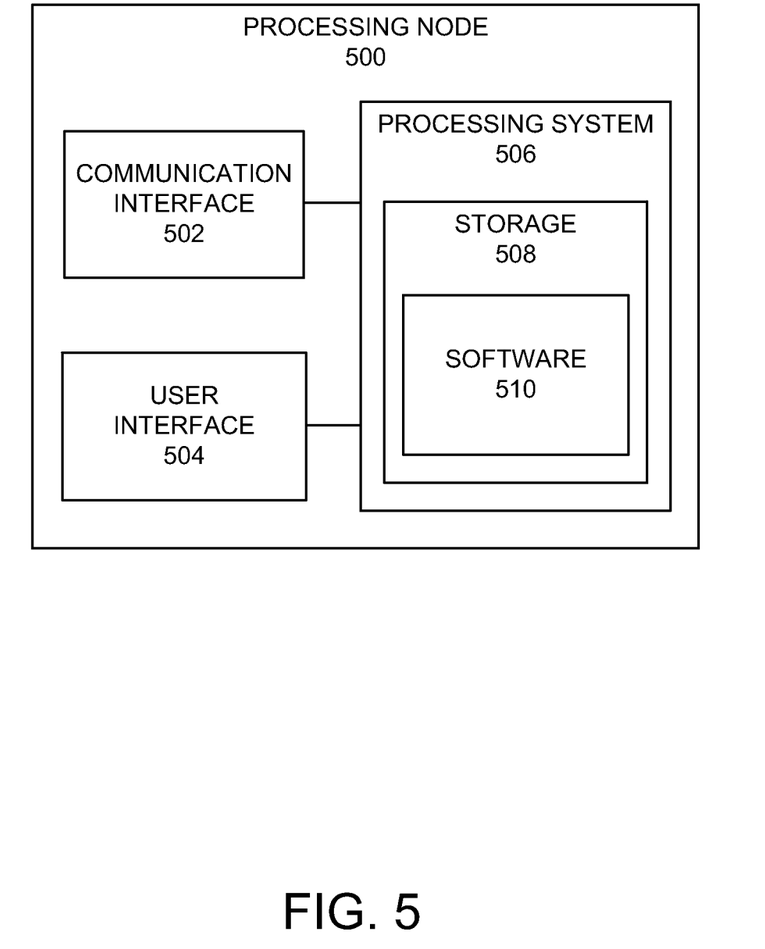
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include controller node 312 and gateway node 314. Processing node 500 can also be an adjunct or component of a network element, such as an element of access nodes 106 or 308 and the like. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling transmissions from an access node, the method comprising:
   monitoring network conditions in a communication network comprising an access node;
   selecting, based on the network conditions, one of a fair scheduling algorithm, a data rate scheduling algorithm, and a hybrid scheduling algorithm;
   scheduling data transmission from the access node based on the selected scheduling algorithm; and
   transmitting data from the access node to wireless devices based on the transmission schedule.

2. The method of claim 1, wherein the fair scheduling algorithm comprises a round robin scheduling algorithm.

3. The method of claim 2,
   wherein the network conditions comprise a mobility for the wireless devices in communication with the access node, and
   wherein the round robin scheduling algorithm is selected when the monitored mobility meets a mobility criteria.

4. The method of claim 2,
   wherein the network conditions comprise whether each wireless device in communication with the access node comprises a smartphone, and
   wherein the round robin scheduling algorithm is selected when the number of wireless devices in communication with the access node that comprise smart phones meets a phone criteria.

5. The method of claim 1, wherein the data rate scheduling algorithm comprises an algorithm that schedules data transmissions based on which of the wireless devices in communication with the first access node comprises a greatest channel quality value.

6. The method of claim 5,
   wherein the network conditions comprise a number of connections between the access node and the wireless devices in communication with the access node, and
   wherein the data rate scheduling algorithm is selected when the monitored number of connections does not meet a connections criteria.

7. The method of claim 5,
   wherein the network conditions comprise a data bearer type for connections between the access node and the wireless devices in communication with the access node, and
   wherein the data rate scheduling algorithm is selected when the monitored data bearer types comprise a number guaranteed data bearers that meets a bearer type criteria.

8. The method of claim 1, wherein the hybrid scheduling algorithm comprises an algorithm that schedules data transmissions based on a balance between the fair scheduling algorithm and the data rate scheduling algorithm.

9. The method of claim 8, wherein the hybrid scheduling algorithm comprises an algorithm that schedules data transmissions based on a metric calculated for each wireless device, the metric being inversely proportional to an average data rate for the wireless device and directly proportional to the instantaneous data rate of the wireless device.

10. The method of claim 8,
    wherein the network conditions comprise a number of connections between the access node and the wireless devices in communication with the access node, and
    wherein the hybrid scheduling algorithm is selected when the monitored number of connections meets a connections criteria.

11. The method of claim 8,
    wherein the network conditions comprise a data bearer type for connections between the access node and the wireless devices in communication with the access node, and
    wherein the hybrid scheduling algorithm is selected when the monitored data bearer types comprise a number nonguaranteed data bearers that meets a bearer type criteria.

12. A system for determining broadcast parameters for a transmission, the system comprising:
    a processing node with a processor configured to:
    monitor network conditions in a communication network comprising an access node;
    select, based on the network conditions, one of a fair scheduling algorithm, a data rate scheduling algorithm, and a hybrid scheduling algorithm;
    schedule data transmission from the access node based on the selected scheduling algorithm; and
    transmit data from the access node to wireless devices based on the transmission schedule.

13. The system of claim 12, wherein the fair scheduling algorithm comprises a round robin scheduling algorithm.

14. The system of claim 13,
    wherein the network conditions comprise a mobility for the wireless devices in communication with the access node, and
    wherein the round robin scheduling algorithm is selected when the monitored mobility meets a mobility criteria.

15. The system of claim 13,
    wherein the network conditions comprise whether each wireless device in communication with the access node comprises a smartphone, and
    wherein the round robin scheduling algorithm is selected when the number of wireless devices in communication with the access node that comprise smart phones meets a phone criteria.

16. The system of claim 12, wherein the data rate scheduling algorithm comprises an algorithm that schedules data transmissions based on which of the wireless devices in communication with the first access node comprises a greatest channel quality value.

17. The system of claim 16,
    wherein the network conditions comprise a number of connections between the access node and the wireless devices in communication with the access node, and
    wherein the data rate scheduling algorithm is selected when the monitored number of connections does not meet a connections criteria.

18. The system of claim 16,
    wherein the network conditions comprise a data bearer type for connections between the access node and the wireless devices in communication with the access node, and
    wherein the data rate scheduling algorithm is selected when the monitored data bearer types comprise a number guaranteed data bearers that meets a bearer type criteria.

19. The system of claim 12, wherein the hybrid scheduling algorithm comprises an algorithm that schedules data transmissions based on a balance between the fair scheduling algorithm and the data rate scheduling algorithm.

20. The system of claim 19, wherein the hybrid scheduling algorithm comprises an algorithm that schedules data transmissions based on a metric calculated for each wireless device, the metric being inversely proportional to an average data rate for the wireless device and directly proportional to the instantaneous data rate of the wireless device.

* * * * *